P. K. DEDERICK.

Hay and Cotton Press.

No. 8,316. Reissued July 2, 1878.

Witnesses.
Franck L. Durand
W. C. Jordinstone

Inventor
Peter K. Dederick
By Hill & Ellsworth
His Attys.

THE NORRIS PETERS CO., PHOTO-LITHO., WASHINGTON, D. C.

UNITED STATES PATENT OFFICE.

PETER K. DEDERICK, OF ALBANY, NEW YORK.

IMPROVEMENT IN HAY AND COTTON PRESSES.

Specification forming part of Letters Patent No. 132,566, dated October 29, 1872; Reissue No. 7,982, dated December 11, 1877; Reissue No. 8,316, dated July 2, 1878; application filed April 18, 1878.

DIVISION A.

*To all whom it may concern:*

Figure 1:
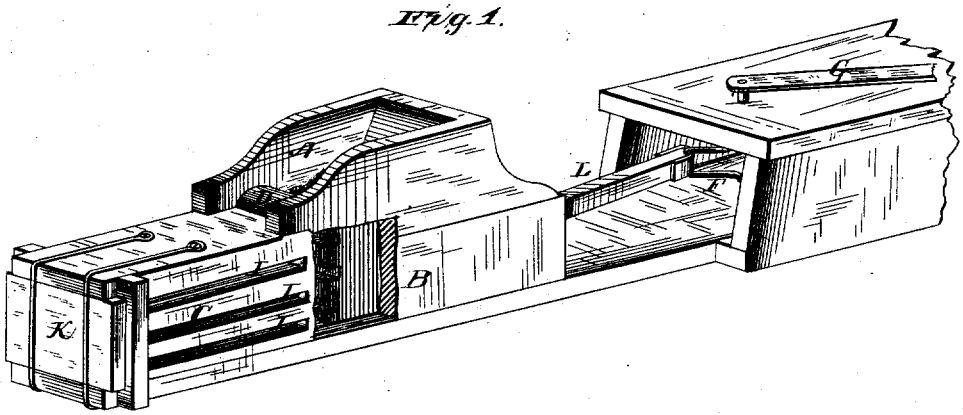
Figure 2:
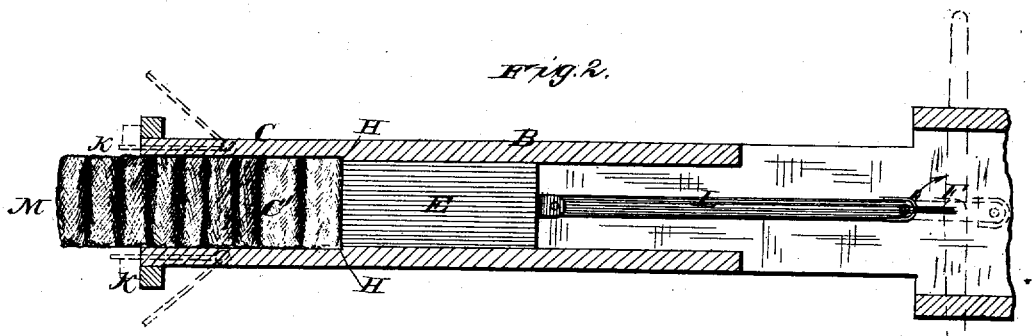
Figure 3:
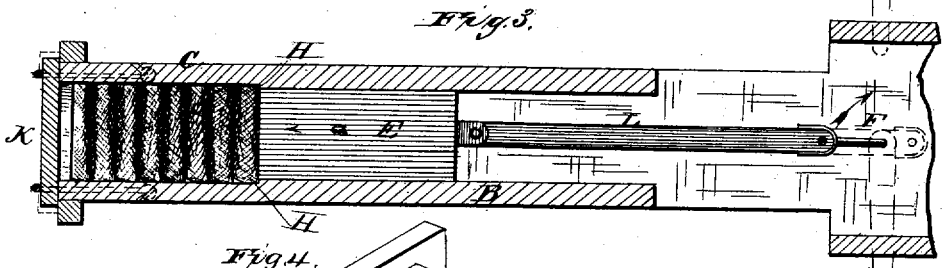
Figure 4:
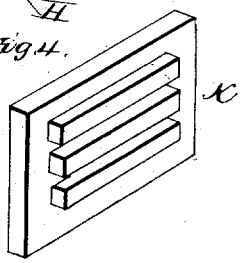

Be it known that I, PETER K. DEDERICK, of the city of Albany, county of Albany, and State of New York, have invented new and useful Improvements in Baling-Presses, of which the following is a specification:

Figure 1 is a perspective view, showing the machine completed and in position for operation, and Fig. 2 is a top or plan view, illustrating the bale-chamber. Fig. 3 is also a top view, showing my improvements and their connections and the manner of operation; and Fig. 4 is a perspective view of the end door.

In the figures, A is the hopper for receiving the loose material. B is the press or receiving box, into which the loose hay is received and pressed. C is the bale-chamber, into which the hay is deposited after pressing. H is a retaining-shoulder for retaining the pressed sections. D is a roller to assist in guiding the hay into the press-box. E is the traverser, which vibrates within the receiving-box B, and when withdrawn its forward end forms one of the upright walls of the chamber. F is a crank, forming a toggle in connection with the pitman L.

This arrangement would also operate another press of similar construction at the opposite side of the crank, and without expense of power, thus constituting a double machine operated by a common power, the pressing being done alternately. G is the sweep, to which the horses are attached.

The power may be applied in a variety of ways. The bale, when formed in the bale-chamber C, is tied or bound through the slots I in the box, as shown in Fig. 1, and is then removed or forced out of the end of the press at K by the pressure exerted by the traverser in building up the next bale, as shown, C′ being the forming bale, and M the finished bale.

The distance between the head of the press and the traverser, when nearest the head, or, in other words, the distance between the retainers that prevent the hay from expanding and the head, may be greater than the dimensions of the bale-chamber any other way, thus forming the length of the bale toward the traverser or point of filling, and as the expansion is always in the same direction, toward the traverser or power, it will be proportionately less as the ends are smaller.

If the bale-chamber were constructed so as to present one of its larger sides to the reciprocating traverser, the expansive force of the hay would be so great that it could not be retained when the traverser was withdrawn, but would expand back with it; but by feeding the charges or sections into the smaller side of the chamber endwise of the bale the amount of friction secured against the walls of the chamber is so much greater in proportion to the expanding or unsupported surface that but little else is required to retain or prevent the hay from expanding back with the traverser when withdrawn.

In operation the traverser is withdrawn by the revolution of the crank, its forward end forming one of the walls of the press-box, and the hay or other material is fed into the hopper A, thence into the press-box B forward of the traverser. The traverser is now forced forward by the crank, which, with the pitman, forms a progressive toggle-joint vibrated laterally, the power increasing with the resistance.

The operation is now repeated and another charge in a like manner deposited in the chamber against the former one. This operation is continued, each successive stroke of the traverser forcing another charge within the chamber and condensing the entire mass by just the amount of additional material forced within the chamber beyond the stroke of the traverser, and the bale is thus compressed to any required solidity, and completed by means of additional charges of material forced within the limits of the chamber. The bale may now be tied off and the door opened. This bale, however, will be rough, in consequence of having nothing compact to commence the bale against.

The operation now changes, and the pressing, instead of being performed in the bale-chamber C, is completed, or nearly so, in the press-box B, and the compressed sections forced into the bale-chamber, where they are retained by the retaining-shoulders H, the pressed material, in connection with the walls of the case, forming the resistance, and the finished bale ejected as fast as the compressed sections are forced behind it within the chamber. After the bale is ejected the door is closed, and the bale further compressed and completed by forcing additional sections of material within the chamber, as in the former case, thus building up the bale endwise in sections piled one against another, and the operation is thus continued, the first bale only being roughly put up.

Having thus described my invention, I claim as follows:

1. The press-box B and hopper A, provided with a movable bottom, in combination with the pitman and crank or toggle L F, substantially for the purpose set forth.

2. The combination of the sweep or horse-lever with the crank F and pitman L for operating the traverser of a baling-press.

3. The crank or toggle L F, in combination with the traverser E, receiving-box B, and bale-chamber C, substantially as described.

4. The combination of the crank or toggle L F with the traverser E, receiving-box B, bale-chamber C, and end door K, substantially as described.

P. K. DEDERICK.

Witnesses:

MELVILLE CHURCH,
WM. BLACKSTOCK.